United States Patent
Reyes-Crespo (10) Patent No.: US 11,358,512 B2
(45) Date of Patent: Jun. 14, 2022

(54) TIRE-MOUNTING STRUCTURES WITH INTERNAL SELF-LOCKING FEATURE

(71) Applicant: TOYOTA MOTOR ENGINEERING & MANUFACTURING NORTH AMERICA, INC., Plano, TX (US)

(72) Inventor: Edgardo Reyes-Crespo, Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 104 days.

(21) Appl. No.: 16/899,405

(22) Filed: Jun. 11, 2020

(65) Prior Publication Data

US 2021/0387559 A1   Dec. 16, 2021

(51) Int. Cl.
*B60P 3/077* (2006.01)
*B60R 9/06* (2006.01)

(52) U.S. Cl.
CPC ............... *B60P 3/077* (2013.01); *B60R 9/06* (2013.01)

(58) Field of Classification Search
CPC ... B60P 3/077; B60R 9/06; B60R 9/10; Y10S 224/924
See application file for complete search history.

(56) References Cited

U.S. PATENT DOCUMENTS

| | | | |
|---|---|---|---|
| 3,912,139 A * | 10/1975 | Bowman | B60R 9/10 410/3 |
| 4,015,718 A * | 4/1977 | Bernard | B62H 3/08 211/5 |
| 5,427,286 A | 6/1995 | Hagerty | |
| 5,560,526 A * | 10/1996 | Jantzen | B60R 9/10 224/571 |
| 6,179,181 B1 * | 1/2001 | Johnson | B60R 9/00 211/20 |
| 6,679,408 B1 | 1/2004 | Thomas et al. | |
| 6,854,630 B2 | 2/2005 | Anderson et al. | |
| 10,569,689 B2 | 2/2020 | Johnson | |
| 2004/0084491 A1 * | 5/2004 | Gibson | B60P 3/07 224/403 |
| 2004/0101390 A1 * | 5/2004 | O'Neil | B60P 3/077 414/537 |
| 2004/0262347 A1 | 12/2004 | Green | |
| 2008/0047994 A1 | 2/2008 | Beamer et al. | |
| 2008/0050212 A1 | 2/2008 | Ormsby | |

(Continued)

FOREIGN PATENT DOCUMENTS

| AU | 2018100605 A4 | 6/2018 |
|---|---|---|
| KR | 20110024867 A | 3/2011 |

*Primary Examiner* — Brian D Nash (74) *Attorney, Agent, or Firm* — Dinsmore & Shohl LLP (57) ABSTRACT

A tire-mounting structure, the tire-mounting structure having a laterally extending end wall, two protrusions longitudinally extending from the end wall, the two protrusions spaced apart from one another, and a recess formed between the two protrusions. The recess is dimensioned such that a first distance between the two protrusions at a distal location relative to the end wall is longer than a second distance between the two protrusions at a proximal location relative to the end wall, where the first distance corresponds to a first tire dimension and the second distance corresponds to a second tire dimension, the second tire dimension being narrower than the first tire dimension.

9 Claims, 4 Drawing Sheets

(56) References Cited

U.S. PATENT DOCUMENTS

| | | | |
|---|---|---|---|
| 2014/0183237 A1* | 7/2014 | Wolfe | B60R 9/10 |
| | | | 224/403 |
| 2015/0232041 A1 | 8/2015 | Wolfe | |
| 2018/0215323 A1 | 8/2018 | Frederick et al. | |
| 2018/0354427 A1* | 12/2018 | Yazdian | A45F 3/24 |
| 2019/0047483 A1* | 2/2019 | Wilterdink | B60R 9/06 |
| 2021/0039610 A1* | 2/2021 | Krolski | B60P 3/075 |

* cited by examiner

TIRE-MOUNTING STRUCTURES WITH INTERNAL SELF-LOCKING FEATURE

FIELD

The present specification generally relates to structures designed for securing other vehicles within a truck bed without the need for external equipment or hardware.

TECHNICAL BACKGROUND

Transportation devices having one or more tires, such as bikes and motorcycles, are often transported from a first point to a second point on or within a larger transport vehicle, such as cars or trucks. A mounting structure or other securing apparatus is often utilized to ensure the device having tires remains secured to the transport vehicle. Many mounting structures, such as vehicular rooftop bike mounts, are large and bulky, substantially extending from the transport vehicle or reducing space within, or access to, a trunk, hatch, or other cavity. Moreover, such mounting structures require extensive manual labor to assemble, attach to the transport vehicle, and adjust. Specifically, depending on the width of one or more tires of the transportation device, the mounting structure will need to be mechanically adjusted to accommodate the specific tire width. Transportation devices having one or more tires may also be secured to transport vehicles with straps, ropes, belts, and the like, thereby increasing the number of components needed to secure the transportation device and increasing the opportunity for user error and unsecure attachment to the transport vehicle.

Accordingly, a need exists for tire-mounting structures that involve little to no modular or moving parts yet are able to accommodate tires of different dimensions, reducing manual labor required to secure a tire within the mounting structure while simultaneously offering stable securement of a tire within the structure.

SUMMARY

In one embodiment, a tire-mounting structure having a laterally extending end wall, two protrusions longitudinally extending from the end wall, the two protrusions spaced apart from one another, and a recess formed between the two protrusions. The recess is dimensioned such that a first distance between the two protrusions at a distal location relative to the end wall is longer than a second distance between the two protrusions at a proximal location relative to the end wall. The first distance corresponds to a first tire dimension and the second distance corresponds to a second tire dimension, where the second tire dimension being narrower than the first tire dimension.

In another embodiment a vehicle, the vehicle having a truck bed and a tire-mounting structure integral with the truck bed. The tire-mounting structure having a laterally extending end wall, two protrusions longitudinally extending from the end wall, the two protrusions spaced apart from one another, and a recess formed between the two protrusions. The recess is dimensioned such that a first distance between the two protrusions at a distal location relative to the end wall is longer than a second distance between the two protrusions at a proximal location relative to the end wall. The first distance corresponds to a first tire dimension and the second distance corresponds to a second tire dimension, the second tire dimension being narrower than the first tire dimension.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure generally relates to a tire-mounting structure that is able to secure tires of various dimensions. The tire-mounting structure generally includes two protrusions extending from an end wall, each protrusion being shaped to accommodate and secure tires of various dimensions.

Figure 1:
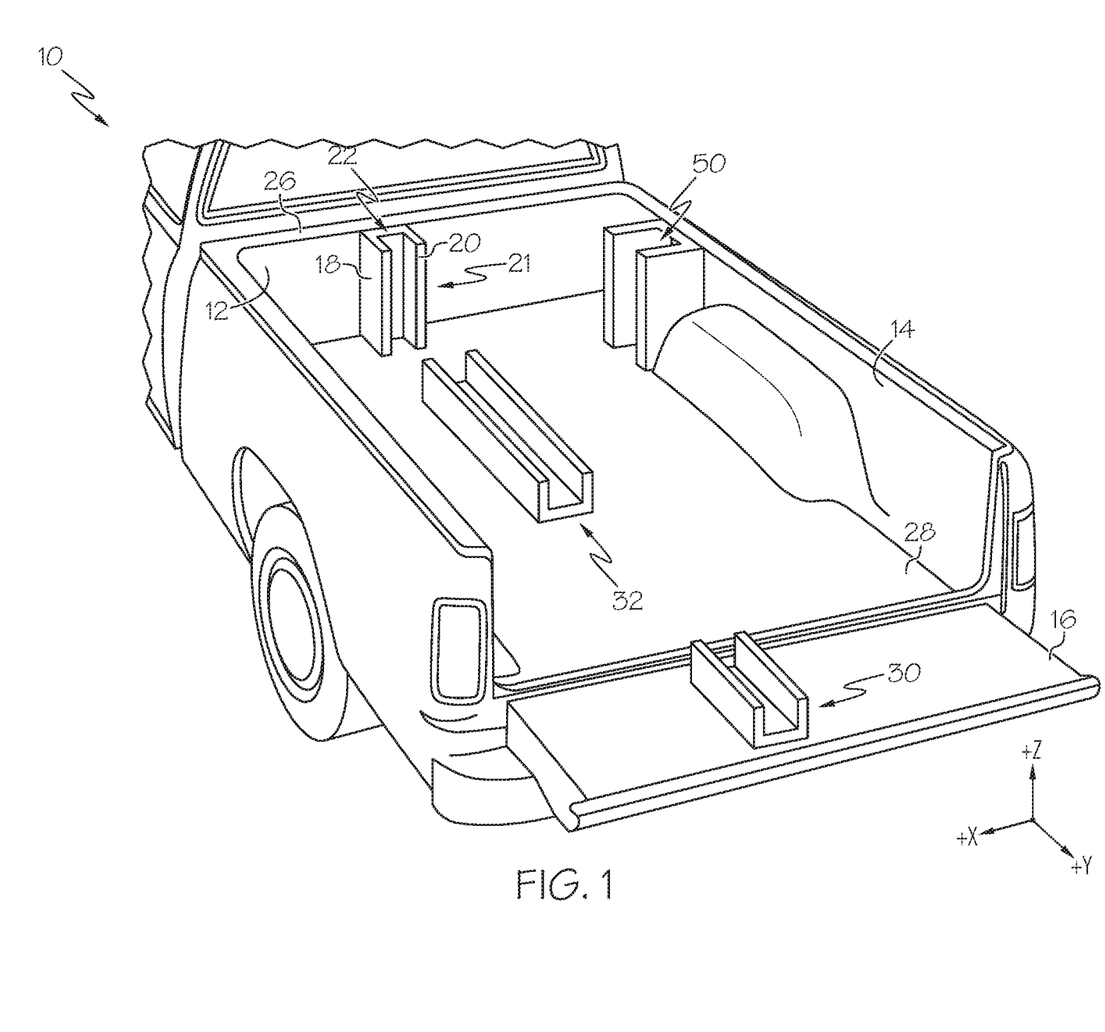
FIG. 1 depicts a perspective view of a vehicle having a tire-mounting structure, according to one or more embodiments shown or described herein.

Referring now to FIG. 1, a perspective view of a truck bed 10 in accordance with an exemplary embodiment of the present disclosure is provided. While the tire-mounting structure is discussed herein as associated with or included in a truck bed, it should be appreciated that the tire-mounting structure can instead be incorporated on or in, or entirely separate from, any other suitable surface of a vehicle. As such, the location of the tire mounting structures described herein are not limited by the present disclosure. The truck bed 10 includes a front wall 12, a side wall 14, a bottom wall 28, and a tailgate 16. The front wall 12 further includes an upper edge 26. One or more tire-mounting structures may be attached to or included in the truck bed 10. For instance, a first tire-mounting structure 21 is attached to the front wall 12, a second tire-mounting structure 50 is attached to the side wall 14, a third tire-mounting structure 32 is attached to the bottom wall 28, and a fourth tire-mounting structure 30 is attached to the tailgate 16. It should be appreciated that the exact placement of the tire-mounting structure on any wall or surface of the truck bed 10 may vary as needed. In some embodiments, the tire-mounting structure may be removably attached to a surface of the truck bed 10. In other embodiments, the tire-mounting structure may be a separate structure that is then fixedly attached to the truck bed 10. In either embodiment, the tire-mounting structure may be made of the same, or a different, material as the bed liner or wall of the truck bed 10 to which the tire-mounting structure is attached. In yet other embodiments, the tire-mounting structure may be integrally formed with the truck bed 10. For instance, during manufacturing, the tire-mounting structure may be directly stamped onto a body panel of a truck such that the tire-mounting structure extends out of the truck bed 10. The tire-mounting structure may also be integral with a liner of the truck bed 10, or in other words, the liner of the truck bed 10 may be shaped to include the outwardly protruding tire-mounting structure. For instance, if the liner of the truck bed 10 is made of glass reinforced polypropylene, the tire-mounting structure may be integrally formed with the liner of the truck bed 10 and be of the same material. In other embodiments, the tire-mounting structure may be made of nylon or any other suitable material. The material chosen for the tire-mounting structure may be coated or sprayed with a UV-protectant, ensuring that the tire-mounting structure will retain its designed shape even during and after periods of UV exposure.

In some embodiments, a single tire-mounting structure is implemented within a truck bed. For instance, the first tire-mounting structure 21 may be included in the truck bed 10 without any of the second, third, or fourth tire-mounting structures 50, 32, and 30. In other embodiments, a plurality tire-mounting structures may be implemented within a single truck bed, transport vehicle, or other base structure. For example, a plurality of tire-mounting structures may be implemented to secure a plurality of objects having tires or transportation devices. For example, one or more tire-mounting structures, in addition to the first tire-mounting structure 21, may be attached to the front wall 12 of the truck bed 10. Each of the tire-mounting structures may receive a tire from a different object, such as a bicycle. While bicycles will be discussed herein as exemplary cargo that can be secured in the tire-mounting structures, it should be appreciated that the tire-mounting structures can secure any device having one or more wheels with tires, such as, for example, unicycles, tricycles, motorcycles, all-terrain vehicles (ATVs), or the like. It should also be appreciated that the tire-mounting structures can secure tires on wheels that are not yet secured to a transportation device or other object. In other embodiments, a plurality of tire-mounting structures may be arranged and used to secure a single bicycle. For instance, a front bicycle tire may be secured by the first tire-mounting structure 21 attached to the front wall 12, and a rear bicycle tire of the same bicycle may be secured by the third tire-mounting structure 32 attached to the bottom wall 28 or the fourth tire-mounting structure 30 attached to the tailgate 16. Depending on the length and/or positioning of a bicycle in the truck bed 10, the fourth tire-mounting structure 30 may secure a tire of the bicycle when the tailgate 16 is in an open position, as in FIG. 1, in a closed position, or at an angled position between the open and closed positions. It should also be appreciated that the arrangement of tire-mounting structures in the truck bed 10 does not limit a user to transporting one or a plurality of bicycles or other objects. In other words, while the first tire-mounting structure 21 and the fourth tire-mounting structure 30 were described as securing tires of a single bicycle, both of the first and fourth tire-mounting structures 21 and 30 may simultaneously be used to secure tires of different bicycles or objects. It should also be appreciated that it is not necessary to secure both tires of a bicycle in separate tire-mounting structures, and that a single tire-mounting structure for one bicycle tire may be sufficient to suitably secure a bicycle within the truck bed 10.

The size of the tire-mounting structures may vary, and are in no way limited by the depiction in FIG. 1. The tire-mounting structures may have any desirable height, width, and depth. With reference to the first tire-mounting structure 21 attached to the front wall 12, specifically, the shape and size of the first tire-mounting structure 21 may be adjusted. The first tire-mounting structure 21 generally includes a lateral end wall and two protrusions longitudinally extending from the end wall. In embodiments where the first tire-mounting structure 21 is integral with the liner of the truck bed 10, the front wall 12 may be the end wall of the first tire-mounting structure 21. In other embodiments, the first tire-mounting structure 21 may include an end wall that is initially separate from the truck bed 10 and is then removably or fixedly attached to the front wall 12 of the truck bed 10. The first tire-mounting structure 21 includes a first protrusion 18 and a second protrusion 20 longitudinally extending from the end wall. The height of the first tire-mounting structure 21 refers to the length of the first tire-mounting structure 21, or the protrusions 18 and 20, in the z direction of the coordinate axes of FIG. 1. In the embodiment depicted, the protrusions 18 and 20 extend from the bottom wall 28 to the upper edge 26 of the front wall 12. However, it should be appreciated that the protrusions 18 and 20 can span any length along the front wall 12. For instance, the bottom of the protrusions 18 and 20 may be above the bottom wall 28 and the top of the protrusions 18 and 20 may be below the upper edge 26 of the front wall 12. The protrusions 18 and 20 are spaced apart from each other such that the first tire-mounting structure 21 includes a recess 22 between the protrusions 18 and 20. The distance between the protrusions 18 and 20 in the x direction of the coordinate axes of FIG. 1 may be referred to as the width of the first tire-mounting structure 21. The width of the first tire-mounting structure 21 may be particularly selected based on the application of the first tire-mounting structure 21, as will be discussed in further detail below. As will also be discussed below, the distance between the protrusions 18 and 20 may vary throughout a depth of the first tire-mounting structure 21. The depth of the first tire-mounting structure 21 may be understood as the straight-line distance from the end wall of the first tire-mounting structure 21 to the outer faces of the protrusions 18 and 20 in the y direction of the coordinate axes of FIG. 1. The outer faces of the protrusions 18 and 20 may be understood as the surfaces of the protrusions 18 and 20 nearest to the tailgate 16. The depth of the first tire-mounting structure 21, or the distance that the longitudinally extending protrusions 18 and 20 extend from the laterally extending end wall may also vary as desired.

Figure 2:
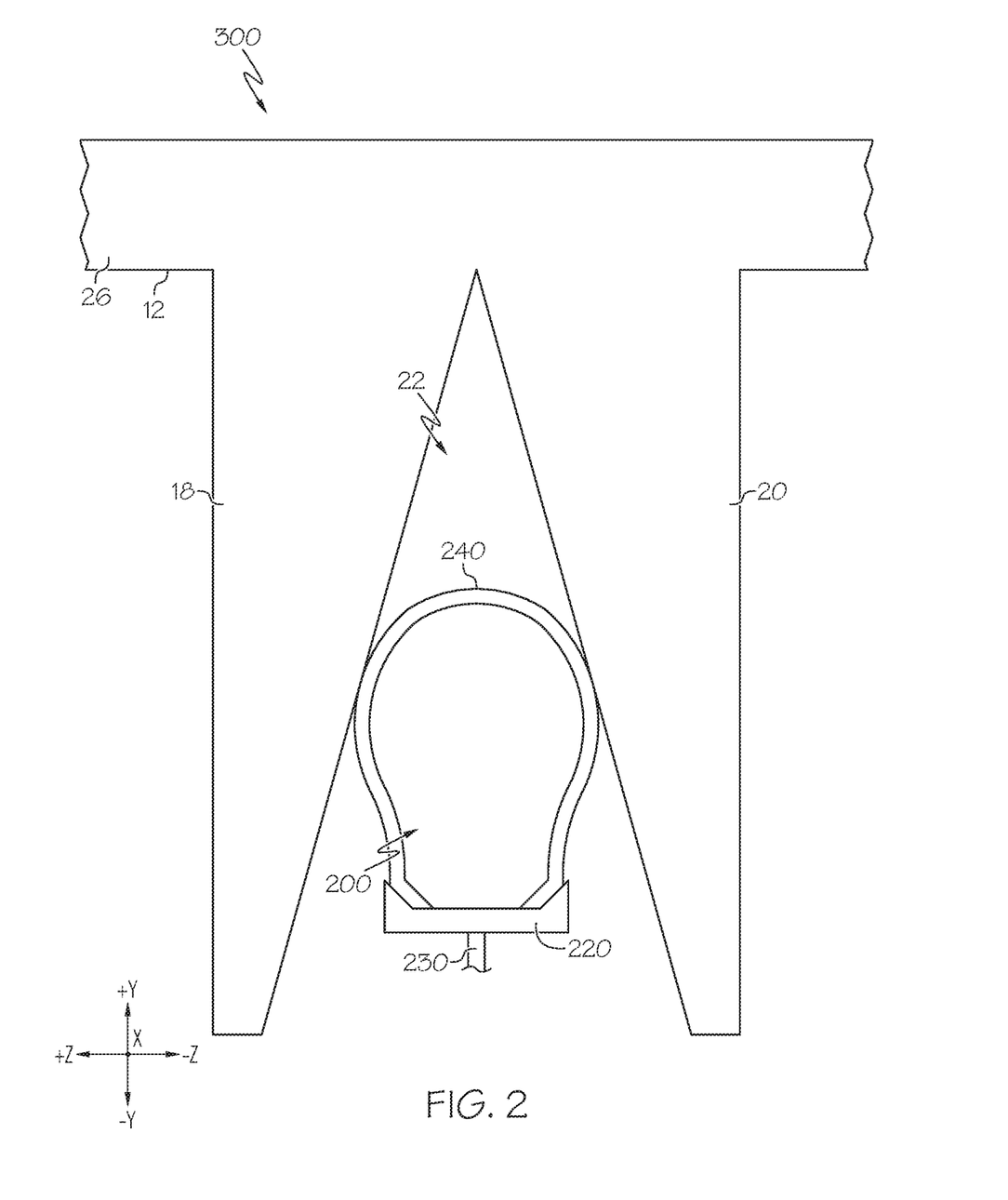
FIG. 2 depicts a top cross sectional view of a tire-mounting structure, according to one or more embodiment shown or described herein.

Referring now to FIG. 2, a top cross sectional view of a tire-mounting structure 300 in accordance with an exemplary embodiment of the present disclosure is provided. The tire-mounting structure 300 may resemble the first tire-mounting structure 21 discussed with respect to FIG. 1, in that the tire-mounting structure 300 may include the first protrusion 18, the second protrusion 20, and the recess 22. As depicted in FIG. 2, the tire-mounting structure 300 is integral with the front wall 12 of the truck bed 10 depicted in FIG. 1, such that the front wall 12 is the laterally extending end wall of the tire-mounting structure 300. A distance between the protrusions 18 and 20 at a point proximal to the front wall 12 is less than a distance between the protrusions 18 and 20 at a point distal relative to the front wall 12. In other words, the recess 22 is tapered in the +y direction of the coordinate axes of FIG. 2. It should be readily appreciated that the tapered dimensions of the recess 22 will vary depending on the distance between the protrusions 18 and 20 in the z direction of the coordinate axes of FIG. 2 and the distance the protrusions 18 and 20 extend from the front wall 12 in the −y direction of the coordinate axes of FIG. 2.

The tapered design of the recess 22 allows the tire-mounting structure 300 to secure tires of different widths and dimensions as needed. A bicycle tire 200 is depicted having a rim 220, a spoke 230, and an outer tread wall 240. The bicycle tire 200 is secured within the recess 22 of the tire-mounting structure 300. In operation, a user may wedge the tire 200 within the recess 22 by applying sufficient force on the tire 200 in the +y direction of the coordinate axes of FIG. 2. The tire 200 traverses the recess 22 until the outer tread wall 240 contacts the inner surfaces of the protrusion 18 and the protrusion 20. The outer tread wall 240 of the tire 200 may slightly deform as it is wedged into the recess 22. The normal forces and friction forces generated at the points of contact between the outer tread wall 240 and the protrusion 18 and the outer tread wall 240 and the protrusion 20 are sufficient to secure and maintain the tire 200 with the recess 22 of the tire-mounting structure 300. The forces applied to the tire 200 are sufficient to secure the tire 200 in the recess 22 during transport of the tire 200 in a truck bed, for instance. The tire 200 remains secured until a user applies a sufficient force opposite the insertion force (in the −y direction of the coordinate axes of FIG. 2) to remove the tire 200 from the recess 22.

It should be apparent that the tire-mounting structure 300 may secure tires of various dimensions due to the tapered design of the recess 22. For example, a tire having a very small width (in the z direction of the coordinate axes of FIG. 2) will traverse deeper into the recess 22 upon insertion than a tire having a larger width. A first point within the recess 22 that is proximal to the front wall 12 compared to a second point within the recess 22, therefore, corresponds to a tire having a smaller width than a tire corresponding to the second point. In other words, the shorter distance between the protrusion 18 and the protrusion 20 at the first point in the recess 22 allows a tire having a smaller width to fit and be secured within the recess 22 at the first point. And the longer distance between the protrusion 18 and the protrusion 20 at the second point in the recess 22 allows a tire having a larger width to be secured within the recess 22 at the second point.

The recess 22 may be sized and tapered to secure a suitable range of tires having different widths. For instance common tire widths for road bikes range between 20 mm to 25 mm, common tire widths for touring bikes range between 32 mm to 38 mm, and common tire widths for mountain bikes range between 2.0 to 2.4 inches. These are merely illustrative, however, and it should be appreciated that the tire-mounting structures discussed herein can secure tires having widths above and below these ranges. For example, many children's bikes may include tires having widths below 20 mm, and motorcycle tire widths may range from 70 mm-160 mm. The tire-mounting structure 300 may be sized to so that the recess 22 corresponds to typical road bikes or to typical mountain bikes. The tire-mounting structure 300 may also be sized so that the recess 22 corresponds to a variety of tire widths. For instance, the recess 22 may be able to secure typical road bike tires, touring bike tires, and mountain bike tires, where the touring bikes would secure within the recess 22 at points deeper (in the +y direction of the coordinate axes of FIG. 2) within the recess 22 than the mountain bikes, and the road bikes would secure within the recess 22 at points deeper (in the +y direction of the coordinate axes of FIG. 2) within the recess 22 than the touring bikes.

Figure 3:
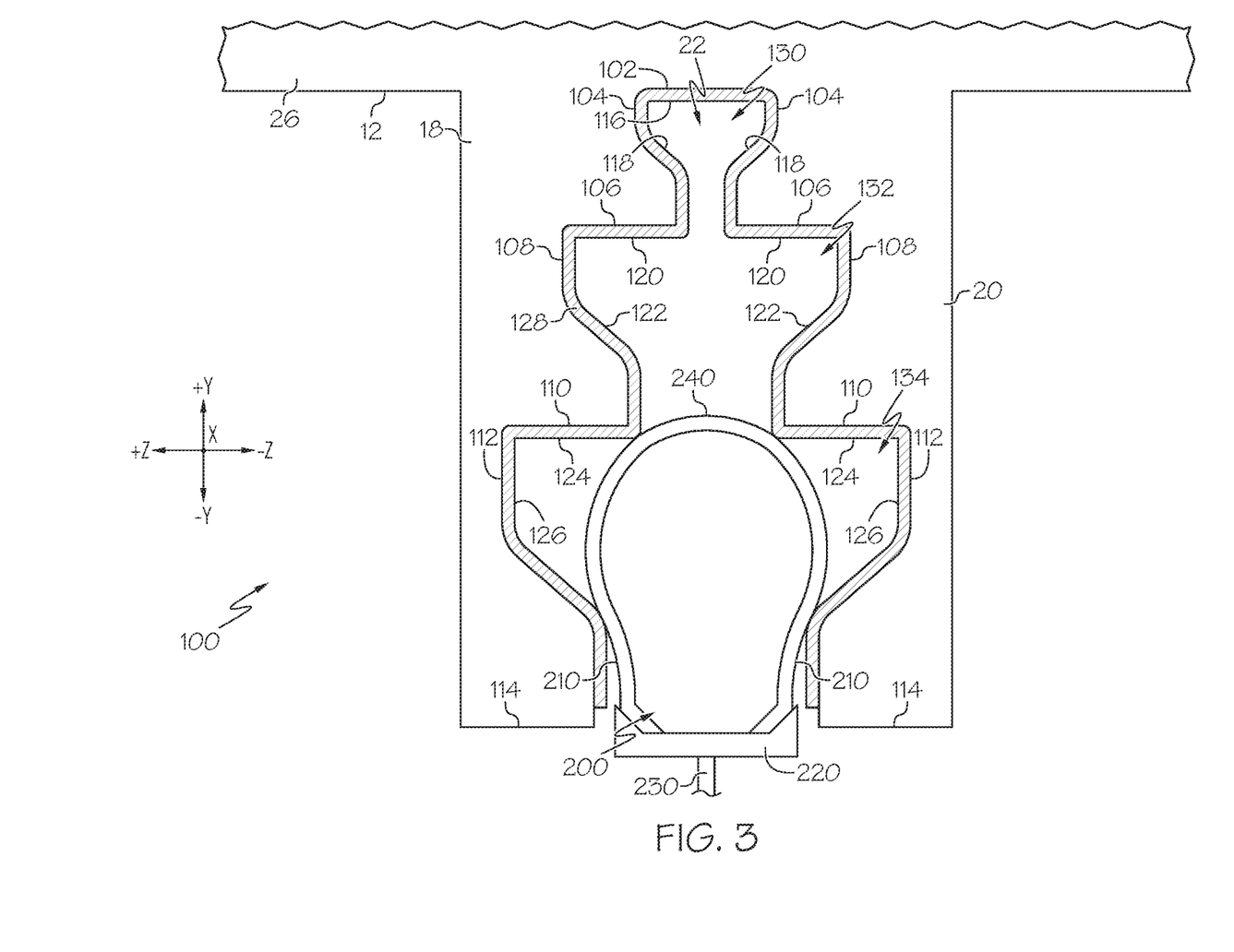
FIG. 3 depicts a top cross sectional view of a tire-mounting structure, according to one or more embodiments shown or described herein.

Referring now to FIG. 3, a top cross sectional view of a tire-mounting structure 100 in accordance with an exemplary embodiment of the present disclosure is provided. The tire-mounting structure 100 may resemble the first tire-mounting structure 21 discussed with respect to FIG. 1, in that the tire-mounting structure 100 may include the first protrusion 18, the second protrusion 20, and the recess 22. As depicted in FIG. 3, the tire-mounting structure 100 is integral with the front wall 12 of the truck bed 10 depicted in FIG. 1, such that the front wall 12 is the laterally extending end wall of the tire-mounting structure 100. The recess 22 of the tire-mounting structure 100 includes a plurality of step-wise tire-receiving slots 130, 132, and 134. The step-wise tire-receiving slots 130-134 narrow from a distal location relative to the front wall 12 to a proximal location to the front wall 12. In other words, the tire-receiving slots narrow in step-wise fashion, such that the tire-receiving slot 132 is narrower than tire-receiving slot 134, and the tire-receiving slot 130 is narrower than tire-receiving slot 132.

The first tire-receiving slot 130 includes a front wall 102 and a pair of curved sidewalls 104. The curved sidewalls 104 extend from the front wall 102 of the first tire-receiving slot 130 to a front wall 106 of the second tire-receiving slot 132. The pair of curved sidewalls 104 are curved such that a first distance between the pair of curved sidewalls at a proximal location relative to the front wall 12 is longer than a second distance between the pair of curved sidewalls 104 at a distal location relative to the front wall 12. Or in other words, the pair of curved sidewalls 104 are curved such that a first distance between the pair of curved sidewalls 104 at a proximal location relative to the front wall 102 is longer than a second distance between the pair of curved sidewalls 104 at a distal location relative to the front wall 102. More specifically, the pair of curved sidewalls 104 include a first predominantly parallel proximal segment of a first width, a second predominantly parallel distal segment of a second width that is less than the first width, and a tapered segment that extends form the first predominantly parallel proximal segment to the second predominantly parallel distal segment (where proximal and distal reference a distance in the y direction of the coordinate axes of FIG. 2 relative the front wall 12 or the front wall 102).

The second tire-receiving slot 132 includes a front wall 106 and a pair of curved sidewalls 108. The curved sidewalls 108 extend from the front wall 106 of the second tire-receiving slot 132 to a front wall 110 of the third tire-receiving slot 134. The pair of curved sidewalls 108 are curved such that a first distance between the pair of curved sidewalls 108 at a proximal location relative to the front wall 12 is longer than a second distance between the pair of curved sidewalls 108 at a distal location relative to the front wall 12. Or in other words, the pair of curved sidewalls 108 are curved such that a first distance between the pair of curved sidewalls 108 at a proximal location relative to the front wall 106 is longer than a second distance between the pair of curved sidewalls 108 at a distal location relative to the front wall 106. More specifically, the pair of curved sidewalls 108 include a first predominantly parallel proximal segment of a first width, a second predominantly parallel distal segment of a second width that is less than the first width, and a tapered segment that extends form the first predominantly parallel proximal segment to the second predominantly parallel distal segment (where proximal and distal reference a distance in the y direction of the coordinate axes of FIG. 3 relative the front wall 12 or the front wall 106).

The third tire-receiving slot 134 includes a front wall 110 and a pair of curved sidewalls 112. The curved sidewalls 112 extend from the front wall 110 of the third tire-receiving slot 134 to an outer face 114 of the protrusions 18 and 20. The pair of curved sidewalls 112 are curved such that a first distance between the pair of curved sidewalls 112 at a proximal location relative to the front wall 12 is longer than a second distance between the pair of curved sidewalls 112 at a distal location relative to the front wall 12. Or in other words, the pair of curved sidewalls 112 are curved such that a first distance between the pair of curved sidewalls 112 at a proximal location relative to the front wall 110 is longer than a second distance between the pair of curved sidewalls 112 at a distal location relative to the front wall 110. More specifically, the pair of curved sidewalls 112 include a first predominantly parallel proximal segment of a first width, a second predominantly parallel distal segment of a second width that is less than the first width, and a tapered segment that extends form the first predominantly parallel proximal segment to the second predominantly parallel distal segment (where proximal and distal reference a distance in the y direction of the coordinate axes of FIG. 3 relative the front wall 12 or the front wall 110).

The tire-receiving slots 130-134 share a central longitudinal axis (in the y direction of the coordinate axes of FIG. 3) with each other and the recess 22. In other words, the central longitudinal axis of each tire-receiving slot 130-134 is the same as the central longitudinal axis of the recess 22. The recess 22 remains continuous through the tire-receiving slots 130-134. Therefore, the front wall 110 of the third tire-receiving slot 134 is segmented such that the second tire-receiving slot 132 opens into the third tire-receiving slot 134, and the front wall 106 of the second tire-receiving slot 132 is segmented such that the first tire-receiving slot 130 opens into the second tire-receiving slot 132.

While the tire-mounting structure 100 is depicted having three tire-receiving slots in FIG. 3, it should appreciated that the tire-mounting structure 100 may contain any desirable number of tire-receiving slots.

Each step-wise tire-receiving slot of the tire-mounting structure 100 is designed to secure tires of different widths. Reference will now be made to the third tire-receiving slot 134 specifically. The tire 200 includes the outer tread wall 240, the rim 220, the spoke 230, and a pair of sidewalls 210. The width of the tire 200 between the pair of sidewalls 210 of the tire 200 is less than the width of the tire 200 at the outer tread wall 240, which bulbously extends from the pair of sidewalls 210 of the tire 200. The tire 200 may be inserted into the third tire-receiving slot 134 by longitudinally inserting (in the y direction of the coordinate axes of FIG. 3) the tire 200 at the opening of the segmented outer face 114 of the protrusions 18 and 20. The protrusions 18 and 20, and therefore the tire-receiving slots 130-134, may be made of a flexible yet resilient material. Therefore, upon longitudinally inserting the tire 200 into the third tire-receiving slot 134 with sufficient force in +y direction of the coordinate axes of FIG. 3, the protrusion 18 may flex outwardly (in the +z direction of the coordinate axes of FIG. 3) and the protrusion 20 may flex outwardly (in the -z direction of the coordinate axes of FIG. 3), allowing the outer tread wall 240 to traverse the second predominantly parallel distal segment of the sidewalls 112, that may otherwise be narrower than the outer tread wall 240 of the tire 200. Once the bulbous outer tread wall 240 completely traverses the second predominantly parallel distal segment of the sidewalls 112 of the third tire-receiving slot 134, the protrusions 18 and 20 may relax and return to their original positions. The front wall 110 of the third tire-receiving slot 134 may contact the outer tread wall 240 of the tire 200 with sufficient force as to prevent the tire 200 from traversing any further into the recess 22.

The above description relates to longitudinal tire insertion when the third tire-receiving slot 134 corresponds to the size of the tire 200 being inserted into the recess 22. A thinner tire that corresponds to the second tire-receiving slot 132 or the first tire-receiving slot 130 may also be longitudinally inserted into the recess 22. For instance, with respect to the second tire-receiving slot 132, the thinner tire may completely enter the third tire-receiving slot 134 without necessitating flexure of the protrusions 18 and 20, as the maximum width of the outer tread wall of the tire is thinner than the second predominantly parallel distal segment of the sidewalls 112. As the tire encounters the second predominantly parallel distal segment of the sidewalls 108 of the second tire-receiving slot 132, which are narrower or have a shorter distance between them than the second predominantly parallel distal segment of the sidewalls 112, sufficient force may be applied in the +y direction of the coordinate axes of FIG. 3 for the protrusions 18 and 20 to flex outwardly (in the +z direction of the coordinate axes of FIG. 3 in the case of the protrusion 18 and in the -z direction of the coordinate axes of FIG. 3 in the case of the protrusion 20). The flexure of the protrusions 18 and 20 may allow the outer tread wall of the tire to traverse the second predominantly parallel distal segment of the sidewalls 108 that may otherwise be narrower than the outer tread wall of the tire. Once the bulbous outer tread wall completely traverses the second predominantly parallel distal segment of the sidewalls 108 of the second tire-receiving slot 132, the protrusions 18 and 20 may relax and return to their original positions.

The tire 200 may also be inserted into the recess 22 vertically (in the x direction of the coordinate axes of FIG. 3). For example, a user may lift the tire 200 over the tire-mounting structure 100 and drop the tire 200 into the correspondingly sized tire-receiving slot of the recess. For instance, a wide tire may be unable to be vertically inserted into the first tire-receiving slot 130 because the dimensions of the outer tread wall 240 of the tire 200 are too large to fit within the first predominantly parallel proximal segment of the sidewalls 104 of the first tire-receiving slot 130 and/or the distance between the sidewalls 210 of the tire 200 is too large to fit within the second predominantly parallel distal segment of the sidewalls 104. The user may then attempt the second tire-receiving slot 132 and the third tire-receiving slot 134. It should be appreciated, however, that the user must not simply select a tire-receiving slot large enough to receive the bicycle tire 200, but the tire-receiving slot that is correspondingly sized with the tire 200. In other words, and as will be discussed in further detail below, a tire that may fit in and be secured by the second tire-receiving slot 132, will also fit within the larger third tire-receiving slot 134, but will not be secured therein.

After insertion of the tire 200 into the correspondingly sized tire-receiving slot of the recess 22 of the tire-mounting structure 100, the tire 200 may be secured within the correspondingly sized tire-receiving slot until a user purposely removes the tire 200 from the tire-receiving slot. In other words, by correspondingly sized, it refers to the tire-receiving slot being appropriately sized to both receive the tire 200 and apply appropriate force to the tire 200 to secure the tire within the tire-receiving slot. With reference to the third tire-receiving slot 134 specifically, the third tire-receiving slot 134 is correspondingly sized to the tire 200 depicted. More specifically, the distance between the first predominantly parallel proximal segment of the sidewalls 112 is large enough to receive the outer tread wall 240 of the tire 200, and the distance between the second predominantly parallel distal segment of the sidewalls 112 is large enough to receive the sidewalls 210 of the tire 200. The junction between the tapered segment of the sidewalls 112 and the second predominantly parallel distal segment of the sidewalls 112 contacts the tire 200 where the bulbous outer tread wall 240 thins into the sidewalls 210. In other words the contact forces between the tapered segment of the sidewalls 112 and the tire 200 prevent the tire 200, and more specifically, the outer tread wall 240 of the tire 200, which is wider than the distance between the second predominantly parallel distal segment of the sidewalls 112, from slipping out of the recess 22 in the −y direction of the coordinate exes of FIG. 3.

To remove the tire 200 from the third tire-receiving slot 134 of the recess 22 of the tire-mounting structure 100, a user may lift the tire 200 (in the x direction of the coordinate axes of FIG. 3) until the tire 200 is no longer between the protrusions 18 and 20. In another embodiment, a user may supply sufficient longitudinal force (in the −y direction of the coordinate axes of FIG. 3) such that the protrusion 18 flexes outwardly (in the +z direction of the coordinate axes of FIG. 3) and the protrusion 20 flexes outwardly (in the −z direction of the coordinate axes of FIG. 3) allowing the tire 200 to be longitudinally removed from the recess 22 in the −y direction of the coordinate axes of FIG. 3. In such embodiments, a flexible yet resilient material is selected to form the tire-mounting structure 100, and more specifically, the protrusions 18 and 20. The protrusions 18 and 20 must be stiff enough such that once the tire is secured within a corresponding tire-receiving slot of the recess 22, any incidental forces applied to the tire 200 during transportation are insufficient to cause flexure of the protrusions 18 and 20, which may otherwise allow the tire 200 to escape from the recess. However, the protrusions 18 and 20 must also be pliable enough to allow a user to manually apply a reasonable force to the tire 200 to flex the protrusions 18 and 20 during removal and/or insertion of the tire 200 in the tire-mounting structure 100.

In other embodiments, the tire-mounting structure may include a removable insert. A removable insert may be applied similarly to the tire-mounting structure 300 depicted in FIG. 2 and the tire-mounting structure 100 depicted in FIG. 3. For simplicity, however, the removable insert will be described in detail only with respect to FIG. 3. Now with specific reference to FIG. 3, an insert 128 is depicted within the recess 22. The insert 128 may be made of resin or any other suitable material. The insert 128 may be shaped and sized to correspond to the recess 22 of the tire-mounting structure 100. More specifically, the outer perimeter of the insert 128 is sized to snuggly fit or match the interior perimeter of the recess 22. In some embodiments, the insert 128 may be used to substantially change the design of the recess 22 or the tire-receiving slots of the recess 22. For instance, it is possible in some embodiments that the protrusions of the tire-mounting structure may have perfectly rectangular cross-sections. In such embodiments, the outer perimeter of the insert may include first and second vertical walls and a horizontal wall therebetween to fit the predominantly rectangular recess between the protrusions. In such embodiments, the interior surface of the recess may be still be designed in a step-wise tire-receiving slot fashion so as to provide step-wise tire-receiving slots for securing tires upon insertion of the insert into the recess.

With specific reference to the embodiment of the insert 128 depicted in FIG. 3, the insert includes a first tire-receiving slot that mirrors the first tire-receiving slot 130. More specifically, the first tire-receiving slot of the insert 128 includes a front wall 116 and a pair of curved sidewalls 118. The curved sidewalls 118 extend from the front wall 116 of the first tire-receiving slot to a front wall 120 of a second tire-receiving slot. The pair of curved sidewalls 118 are curved such that a first distance between the pair of curved sidewalls 118 at a proximal location relative to the front wall 12 is longer than a second distance between the pair of curved sidewalls 118 at a distal location relative to the front wall 12. Or in other words, the pair of curved sidewalls 118 are curved such that a first distance between the pair of curved sidewalls 118 at a proximal location relative to the front wall 116 is longer than a second distance between the pair of curved sidewalls 118 at a distal location relative to the front wall 116. More specifically, the pair of curved sidewalls 118 include a first predominantly parallel proximal segment of a first width, a second predominantly parallel distal segment of a second width that is less than the first width, and a tapered segment that extends form the first predominantly parallel proximal segment to the second predominantly parallel distal segment (where proximal and distal reference a distance in the y direction of the coordinate axes of FIG. 3 relative the front wall 12 or the front wall 116).

The insert further includes a second tire-receiving slot that mirrors the second tire-receiving slot 132. More specifically, the second tire-receiving slot of the insert 128 includes a front wall 120 and a pair of curved sidewalls 122. The curved sidewalls 122 extend from the front wall 120 of the second tire-receiving slot to a front wall 124 of a third tire-receiving slot. The pair of curved sidewalls 122 are curved such that a first distance between the pair of curved sidewalls 122 at a proximal location relative to the front wall 12 is longer than a second distance between the pair of curved sidewalls 122 at a distal location relative to the front wall 12. Or in other words, the pair of curved sidewalls 122 are curved such that a first distance between the pair of curved sidewalls 122 at a proximal location relative to the front wall 120 is longer than a second distance between the pair of curved sidewalls 122 at a distal location relative to the front wall 120. More specifically, the pair of curved sidewalls 122 include a first predominantly parallel proximal segment of a first width, a second predominantly parallel distal segment of a second width that is less than the first width, and a tapered segment that extends form the first predominantly parallel proximal segment to the second predominantly parallel distal segment (where proximal and distal reference a distance in the y direction of the coordinate axes of FIG. 3 relative the front wall 12 or the front wall 120).

The third tire-receiving slot of the insert 128 includes a front wall 124 and a pair of curved sidewalls 126. The curved sidewalls 126 extend from the front wall 124 of the third tire-receiving slot toward the outer face 114 of the protrusions 18 and 20. The pair of curved sidewalls 126 are curved such that a first distance between the pair of curved sidewalls 126 at a proximal location relative to the front wall 12 is longer than a second distance between the pair of curved sidewalls 126 at a distal location relative to the front wall 12. Or in other words, the pair of curved sidewalls 126 are curved such that a first distance between the pair of curved sidewalls 126 at a proximal location relative to the front wall 124 is longer than a second distance between the pair of curved sidewalls 126 at a distal location relative to the front wall 124. More specifically, the pair of curved sidewalls 126 include a first predominantly parallel proximal segment with a first width, a second predominantly parallel distal segment with a second width that is less than the first width, and a tapered segment that extends form the first predominantly parallel proximal segment to the second predominantly parallel distal segment (where proximal and distal reference a distance in the y direction of the coordinate axes of FIG. 3 relative the front wall 12 or the front wall 124).

The insert 128 functions to reduce the space within the recess 22, or more specifically, reduce the size of each tire-receiving slot 130, 132, and 134. For instance, with respect to the third tire-receiving slot 134 specifically, the distance between the first predominantly parallel proximal segment of the sidewalls 112 is now reduced by the thickness of the insert 128, or the first predominantly parallel proximal segment of the sidewalls 126 of the insert 128 that border the sidewalls 112. Similarly, the distance between the tapered segment of the sidewalls 112 is reduced by the thickness of the tapered segment of the sidewalls 126 of the insert 128 that border the sidewalls 112, and the distance between the second predominantly parallel distal segment of the sidewalls 112 is reduced by the thickness of the second predominantly parallel distal segment of the sidewalls 126 of the insert 128 that border the sidewalls 112. In some embodiments the insert 128 may have a uniform thickness, and in other embodiments, the insert 128 may have a non-uniform thickness such that a first portion of a tire-receiving slot is reduced in size more or less than a second portion of a tire-receiving slot.

The tire-mounting structure 100 functions predominantly the same with the insert 128 within the recess 22 as it does without the insert 128 within the recess 22. Therefore, the above description of the insertion of the tire 200 in the recess 22, the securement of the tire 200 in the recess 22, and the removal of the tire 200 in the recess 22 similarly apply when the insert 128 is within the recess 22. Notably, however, the insert 128 alters the tire size that each tire-receiving slot 130, 132, and 134 corresponds to. In other words, by reducing the distances between the sidewalls of each tire-receiving slot, each tire-receiving slot is adjusted to accept and secure a tire having a smaller width than each tire-receiving slot would otherwise accept and secure without the insert 128. It should be appreciated that the insert 128 may be swapped for any number of inserts that correspond to the interior perimeter of the recess 22. In other words, by choosing from a plurality of inserts, each having unique thicknesses, the tire-receiving slots 130, 132, and 134 of the recess may be selectively adjusted to accept and secure a variety of different sized tires.

Still with reference to FIG. 3, it should be appreciated that the tire-mounting structure 100 may be selectively sized. For instance, the tire-receiving slots 130, 132, and 134 of the recess 22 may be originally sized to accept and secure tires in the range of mountain bike tire widths (2.0 to 2.4 inches). A first insert may then be inserted into the recess 22, reducing the sizes of the tire-receiving slots 130-134 such that the tire-receiving slots 130-134 become sized to accept and secure tires in the range of touring bike tire widths (32 to 38 mm). Similarly, a second insert may be inserted into the recess 22, reducing the sizes of the tire-receiving slots 130-134 such that the tire-receiving slots become sized to accept and secure tires in the range of road bike tire widths (20 to 25 mm). These are merely examples, however. It should be appreciated that the recess may be initially sized to secure larger tires, such as motorcycle tires, and inserts may be applied that adjust the tire-receiving slots 130-134 to secure tires thinner than road bike tires.

Figure 4:
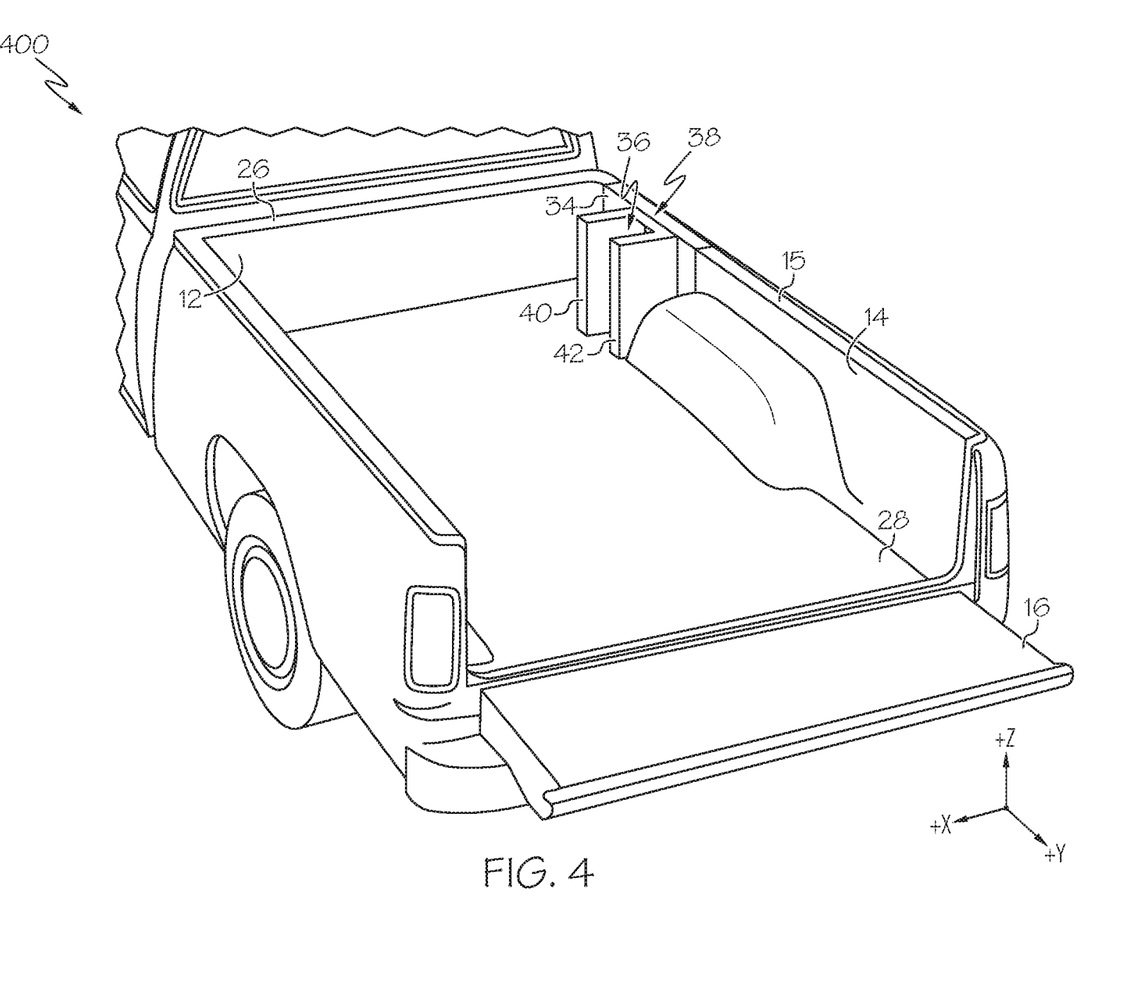
FIG. 4 depicts a perspective view of a vehicle having a tire-mounting structure fixed to an insertable wall, according to one or more embodiments shown or described herein.

Referring now to FIG. 4, a perspective view of a truck bed 400 in accordance with an exemplary embodiment of the present disclosure is provided. The truck bed 400 may be the same as the truck bed 10 depicted in FIG. 1, except as noted herein. A tire-mounting structure 38 includes a protrusion 40, a protrusion 42, and a recess 36 therebetween. The tire-mounting structure 38 is fixedly attached to an insertable wall 34. Therefore, a surface of the truck bed 400 does not act as the end wall of the tire-mounting structure 38. Instead the insertable wall 34 is the end wall of the tire-mounting structure 38. The insertable wall 34 may be removably attached to any surface of the truck bed 400. While the insertable wall is depicted removably attached to the side wall 14 of the truck bed 400, it may be similarly attached to the tailgate 16, the bottom wall 28, or the front wall 12. The insertable wall 34 may removably attach to a surface of the truck bed 400 with the use of any suitable or standard fixation device. For example, the insertable wall 34 may include an upper lip that clamps around an upper edge of a wall of the truck bed 400, such as the upper edge 15 of the side wall 14. The insertable wall 34 may also be attached to a surface of the truck bed 400 with screws, bolts, ties, rope, or any other suitable device. The insertable wall 34 need not be flush with a wall of the truck bed 400. For instance, in some embodiments, the insertable wall 34 may be attached to the sidewalls of the truck bed 400 and extends across the width of the truck bed 400, separated from either the front wall 12 or the tailgate 16, effectively bisecting the truck bed 400. It should be appreciated that the only notable difference between the tire-mounting structure 38 and the tire-mounting structure 300 depicted in FIG. 2 and/or the tire-mounting structure 100 depicted in FIG. 3 is that the insertable wall 34 functions as the end wall of the tire-mounting structure 38. Therefore, the previous discussions relating to the structure and operation of the tapered tire-mounting structure 300 (FIG. 2), the step-wise tire-mounting structure 100 (FIG. 3), and the insert 128 (FIG. 3), similarly apply to the tire-mounting structure 38.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A tire-mounting structure, comprising:
a laterally extending end wall;
two protrusions longitudinally extending from the end wall and spaced apart from one another to define a recess between the two protrusions, the recess dimensioned such that a first distance, corresponding to a first tire dimension, between the two protrusions at a distal location relative to the end wall is longer than a second distance, corresponding to a second tire dimension narrower than the first tire dimension, between the two protrusions at a proximal location relative to the end wall, the recess comprising a plurality of step-wise tire-receiving slots that narrow from the distal location to the proximal location.

2. The tire-mounting structure of claim 1, wherein each step-wise tire-receiving slot of the plurality of step-wise tire-receiving slots comprises a pair of curved sidewalls, a first distance between the pair of curved sidewalls at a proximal location relative to the end wall is longer than a second distance between the pair of curved sidewalls at a distal location relative to the end wall.

3. The tire-mounting structure of claim 1 further comprising an insertable wall, wherein:

the insertable wall comprises the laterally extending end wall; and the insertable wall is securable to an interior surface of a truck bed.

4. A tire-mounting structure, the tire-mounting structure comprising:

a laterally extending end wall;

two protrusions longitudinally extending from the end wall, the two protrusions spaced apart from one another to define a recess between the two protrusions, the recess dimensioned such that a first distance between the two protrusions at a distal location relative to the end wall is longer than a second distance between the two protrusions at a proximal location relative to the end wall, the first distance corresponding to a first tire dimension and the second distance corresponding to a second tire dimension, the second tire dimension being narrower than the first tire dimension; and an insert, wherein:

the insert is dimensioned to correspond to the recess; and the insert reduces the first distance between the two protrusions at the distal location relative to the end wall such that the first distance corresponds to a third tire dimension, wherein the third tire dimension is smaller than the first tire dimension; and the insert reduces the second distance between the two protrusions at the proximal location relative to the end wall such that the second distance corresponds to a fourth tire dimension, wherein the fourth tire dimension is smaller than the second tire dimension.

5. The tire-mounting structure of claim 4, wherein:

a plurality of inserts are dimensioned to correspond to the recess; and each of the plurality of inserts comprises a different thickness, the different thickness resulting in a unique third tire dimension and a unique fourth tire dimension.

6. The tire-mounting structure of claim 4, wherein the insert comprises a plurality of step-wise tire-receiving slots, the plurality of step-wise tire-receiving slots narrowing from the distal location relative to the end wall to the proximal location to the end wall.

7. The tire-mounting structure of claim 6, wherein each step-wise tire-receiving slot of the plurality of step-wise tire-receiving slots comprises a pair of curved sidewalls, a first distance between the pair of curved sidewalls at a proximal location relative to the end wall is longer than a second distance between the pair of curved sidewalls at a distal location relative to the end wall.

8. A vehicle, the vehicle comprising:

a truck bed; and a tire-mounting structure integral with the truck bed, the tire-mounting structure further comprising:

a laterally extending end wall;

two protrusions longitudinally extending from the end wall, the two protrusions spaced apart from one another to define a recess between the two protrusions, the recess dimensioned such that a first distance between the two protrusions at a distal location relative to the end wall is longer than a second distance between the two protrusions at a proximal location relative to the end wall, wherein the first distance corresponds to a first tire dimension and the second distance corresponds to a second tire dimension, the second tire dimension being narrower than the first tire dimension, and wherein the recess comprises a plurality of step-wise tire-receiving slots that narrow from the distal location to the proximal location.

9. The vehicle of claim 8 further comprising an insert, wherein:

the insert is dimensioned to correspond to the recess; and the insert reduces the first distance between the two protrusions at the distal location relative to the end wall such that the first distance corresponds to a third tire dimension, wherein the third tire dimension is smaller than the first tire dimension; and the insert reduces the second distance between the two protrusions at the proximal location relative to the end wall such that the second distance corresponds to a fourth tire dimension, wherein the fourth tire dimension is smaller than the second tire dimension.

* * * * *

UNITED STATES PATENT AND TRADEMARK OFFICE
CERTIFICATE OF CORRECTION

PATENT NO. : 11,358,512 B2
APPLICATION NO. : 16/899405
DATED : June 14, 2022
INVENTOR(S) : Edgardo Reyes-Crespo It is certified that error appears in the above-identified patent and that said Letters Patent is hereby corrected as shown below:

In the Claims

Column 12, Line 66, Claim 3, after "claim 1", insert --,--.

Column 14, Line 28, Claim 9, after "claim 8", insert --,--.

Signed and Sealed this
Twenty-sixth Day of July, 2022

Katherine Kelly Vidal
*Director of the United States Patent and Trademark Office*